Aug. 7, 1928.
C. G. MUNTERS
1,679,440
REFRIGERATION
Original Filed May 7, 1926
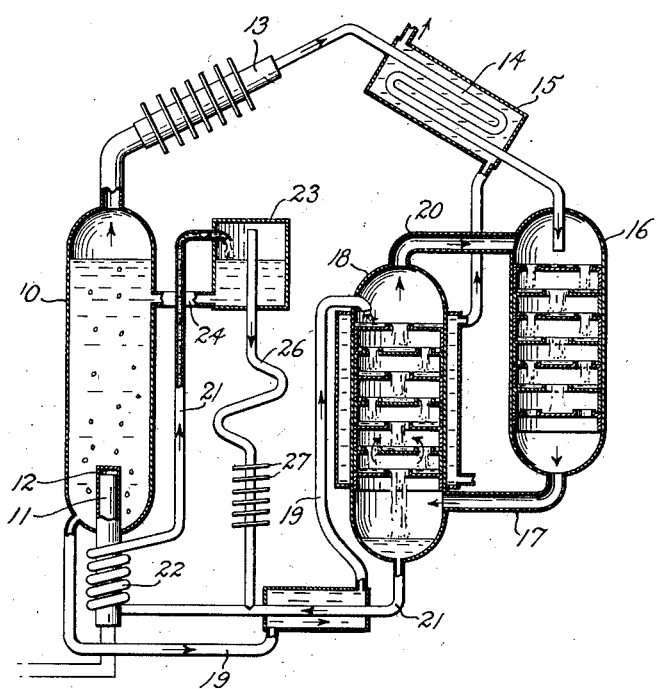
INVENTOR
Carl Georg Munters
BY
N. T. Hedlund
his ATTORNEY Patented Aug. 7, 1928.

1,679,440

UNITED STATES PATENT OFFICE.

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE.

REFRIGERATION.

Original application filed May 7, 1926, Serial No. 107,376, and in Germany March 9, 1926. Divided and this application filed May 9, 1928. Serial No. 276,296.

This application is a division of my copending application Serial No. 107,376, filed May 7, 1926.

My invention relates to refrigerating apparatus of the absorption type and more particularly to refrigerating apparatus having a constant or gage pressure throughout, in which refrigeration is obtained by evaporation due to diffusion of a cooling agent into another substance. The invention has for objects, amongst others, to provide an improved circulation between the absorber and generator in refrigerating apparatus of the absorption type; to provide a continuously and evenly operating circulating arrangement with a highly efficient circulation; and to obtain an improved thermodynamic efficiency of the complete refrigerating process.

One characteristic feature of the invention is the introduction of a fluid into the path of flow of the absorption liquid in local circulation between the absorber and the generator, which fluid volatilzes at a temperature of the absorption liquid which is lower than the temperature at which the cooling agent is expelled from the absorption liquid in the generator. This fluid is caused to flow in a circulatory path which is preferably local as respects complete refrigerating organization.

The invention will be explained by reference to the accompanying drawing illustrating one example of the invention, on which reference character 10 designates a generator which contains absorption liquid and wherein the cooling agent, for example ammonia, is abstracted by heat from solution in the absorption liquid, which may be, for example, water, the supply of heat consisting, in the embodiment shown, of an electric element 11 which is arranged within the pocket 12 set into the metal shell of the generator.

Vapor generated in generator 10 passes through conduit 13 and into condenser 14 which comprises a conduit in which the vapor is condensed by means of a cooling fluid such as water circulating through cooling jacket 15 surrounding the same. From condenser 14 the cooling agent in the form of liquid passes into the evaporator 16 where it mixes with an auxiliary agent, which may be, for example, hydrogen, into which it diffuses and, as a result, evaporates, thus producing refrigeration. Ammonia gas and hydrogen then pass downwardly through the evaporator as a mixture and through conduit 17 into the lower part of absorber 18. In the absorber the ammonia gas is separated from the hydrogen and passes into solution in absorption liquid supplied to the absorber from the generator by way of conduit 19. The hydrogen thus freed passes upwardly in the absorber and through conduit 20 back into the evaporator to again mix with ammonia coming from the condenser.

The present invention is not specifically directed to the general arrangement thus far described, and this arrangement is herein set out for the purpose of illustration. For a further and more detailed description of the operation of the parts hereinbefore described reference may be had to a co-pending application Serial No. 596,646, filed October 24, 1922, by Baltzar Carl von Platen and myself, which has resulted in Patent No. 1,609,334, granted December 7, 1926. The arrangement thus far described and set out in the co-pending application is not the only arrangement applicable to use with the present invention as will be understood from further description.

Strong absorption liquid passes through conduit 21 from the lower part of the absorber to the upper part of generator 10. Conduit 21 is in part composed of a coil 22 which surrounds pocket 12 and electric heating element 11 and which is intensely heated by element 11. This conduit is connected with a vessel 23 which may be termed a gas separation vessel. Vessel 23 is situated so that a liquid level may be maintained in the same at the same height as the liquid level in the generator. Conduit 21 opens into the upper part of vessel 23. The lower part of vessel 23 is connected to the generator by means of conduit 24. A conduit 26 is connected to the upper part of vessel 23 and is also connected to conduit 21 at a point between the absorber and coil 22. This conduit 26 is in part formed as a condenser, this condenser being shown as cooled by air through the intermediary of cooling fins 27. Thus there is formed a circulating system including conduit 26, parts of conduit 21, coil 22 and the upper part of gas separation vessel 23. This circulating system contains a fluid, the circulation of which is confined to this system and is, therefore, local in nature. This local circulating system contains a generator, consisting of coil 22, in which this auxiliary fluid is vaporized; a separator, consisting of gas separation vessel 23, in which this auxiliary fluid in gaseous form is separated from absorption liquid saturated with cooling agent; and a condenser in which the auxiliary fluid is liquefied and from which it passes back to its generator. With the other co-operating media above designated, the auxiliary fluid may consist of butane.

In operation:

Strong absorption liquid, rich in ammonia, passes from the absorber into conduit 21 and is mixed with the auxiliary fluid in the form of liquid passing into conduit 21 from conduit 26. Thus there is a simultaneous introduction of three (or possibly more) substances into coil 22. The auxiliary fluid being more readily volatilized than the ammonia solution, bubbles of vapor of the auxiliary fluid are formed in coil 22, which bubbles serve to decrease the head of liquid in the up-leg of conduit 21 and there results a lifting of fluid from absorber 18 to gas separation vessel 23. In this operation the ammonia is not expelled from solution or is expelled to a small degree. In vessel 23 the auxiliary fluid separates from the ammonia solution due to gravity. The strong liquid flows through conduit 24 into generator 10 in which the cooling agent is expelled from the absorption liquid while the auxiliary fluid passes in gaseous form down through conduit 26, in the lower part of which it is condensed.

The auxiliary fluid may be of nature entirely independent of the cooling agent, though this is not necessary.

It will be obvious that various departures may be made from the arrangement herein shown and that other apparati may be built which fall within the terms of the invention. As one obvious change, I desire to point out that the condenser for the auxiliary fluid may be liquid cooled instead of air cooled. This would be preferable in using some fluids such as propane.

It will further be obvious from the above description that an arrangement can be made wherein the introduction of the auxiliary fluid takes place into the conduit carrying absorption liquid from the generator to the absorber. Such an arrangement may be used in combination with the embodiment above described. This may involve a rearrangement of the generator and absorber, which matter will be apparent to one skilled in the art.

What I claim is:

1. Refrigerating apparatus comprising a generator for expelling a cooling agent from solution in an absorption liquid therein, a condenser for condensing the cooling agent, an evaporator for evaporating the cooling agent, an absorber for absorbing the cooling agent, an auxiliary liquefying member, a gas separation vessel and connections between the aforementioned elements to afford a major cycle of circulation for the cooling agent through and between the generator, the condenser, the evaporator and the absorber, to afford a local cycle of circulation between and through the absorber and the evaporator for a pressure equalizing medium contained therein, to afford a local cycle of circulation between and through the generator, the gas separation vessel and the absorber for absorption liquid, and to afford a local cycle of circulation between and through the gas separation vessel and the auxiliary liquefying member for an auxiliary fluid contained therein.

2. That improvement in the art of refrigerating through the agency of a generator-condenser-evaporator-absorber cycle having a local cycle of circulation for absorption liquid containing a cooling agent in solution between the generator and absorber which consists in introducing into the absorption liquid in the local cycle an auxiliary fluid adapted to be vaporized in the presence of the absorption liquid at a lower temperature than that temperature at which the cooling agent is expelled from the absorption liquid, heating the absorption liquid and auxiliary fluid to vaporize the auxiliary fluid and thus decrease the density of the added fluids within the cycle, producing circulation of the absorption liquid under the influence of the decrease in density, withdrawing the vapor of the auxiliary fluid, and liquefying and reintroducing the auxiliary fluid into the cycle to again become vaporized.

3. The method of moving an absorption liquid containing a volatile fluid in solution within a circuit which comprises introducing into the circuit an auxiliary fluid capable of being volatilized in the presence of the absorption liquid at a lower temperature than that at which the first-mentioned volatile fluid is volatilized in the presence of the absorption liquid, heating the added fluids to vaporize the auxiliary fluid and to decrease the density of the added fluids, producing circulation under the influence of the decrease of density, separating the volatilized auxiliary fluid from the absorption liquid containing the first-mentioned volatile fluid and liquefying and reintroducing the auxiliary fluid into the circuit to again be heated and transferred from liquid to gaseous form.

4. The method of moving an absorption liquid containing a volatile fluid in solution within a circuit which comprises introducing into the circuit an auxiliary fluid in liquid form, said auxiliary fluid being capable of volatilization in the presence of the absorption liquid at a lower temperature than that at which the first-mentioned volatile fluid is volatilized in the presence of the absorption liquid, heating the mixture of fluids thus produced to vaporize the auxiliary fluid and to decrease the density of the added fluids, producing circulation under the influence of the decrease of density, separating the volatilized auxiliary fluid from the absorption liquid containing the first-mentioned fluid, liquefying the auxiliary fluid thus separated and reintroducing the condensed auxiliary fluid into the circuit to again become vaporized.

5. The method of moving an absorption liquid containing a volatile fluid in solution within a circuit which comprises introducing into the circuit an auxiliary fluid in liquid form, said auxiliary fluid being capable of volatilization in the presence of the absorption liquid at a lower temperature than that at which the first-mentioned volatile fluid is volatilized in the presence of the absorption liquid, heating the mixture of fluids thus produced to vaporize the auxiliary fluid and to decrease the density of the added fluids, producing circulation under the influence of the decrease of density, separating the volatilized auxiliary fluid from the absorption liquid containing the first-mentioned volatile fluid, liquefying the auxiliary fluid thus separated and reintroducing the liquefied auxiliary fluid into the circuit to again become vaporized.

6. Refrigerating apparatus comprising a generator, an absorber, a condenser, an evaporator, a conduit for conducting absorption liquid from said absorber to said generator, heating means for said conduit and means to withdraw gaseous fluid from said conduit between said heating means and said generator and to liquefy the withdrawn fluid and reintroduce the same into the conduit between the absorber and the heating means.

7. That step in refrigerating through the agency of an absorption system including a generator and an absorber which consists in moving absorption liquid laden with a cooling agent in circuit between the generator and absorber by vaporization and liquefaction of an auxiliary fluid capable of volatilization in the presence of the absorption liquid at a different temperature than the cooling agent.

In testimony whereof, I hereunto affix my signature.

CARL GEORG MUNTERS.